United States Patent [19]
Solomon et al.

[11] Patent Number: 5,775,169
[45] Date of Patent: Jul. 7, 1998

[54] ROBOTIC ARM HAVING A SPLASH GUARD

[75] Inventors: Todd Solomon, Los Gatos; Donald J. Thomas, San Jose, both of Calif.

[73] Assignee: Smart Machines, San Jose, Calif.

[21] Appl. No.: 677,492

[22] Filed: Jul. 9, 1996

Related U.S. Application Data

[63] Continuation-in-part of Ser. No. 500,124, Jul. 10, 1995, Pat. No. 5,676,472.

[51] Int. Cl.⁶ .................. B25J 17/00; B25J 18/00; F16C 33/76
[52] U.S. Cl. .................. 74/490.01; 277/56; 384/488; 901/28; 901/50
[58] Field of Search .................. 74/490.01; 277/14 V, 277/56; 384/488; 901/28, 49, 50

[56] References Cited

U.S. PATENT DOCUMENTS

| | | | |
|---|---|---|---|
| 1,806,748 | 5/1931 | Edwards | 384/488 |
| 2,779,640 | 1/1957 | Jones et al. | 308/187 |
| 4,033,643 | 7/1977 | Miller et al. | 384/488 |
| 4,348,067 | 9/1982 | Tooley | 308/187 |
| 4,527,915 | 7/1985 | Ikariishi et al. | 384/480 |
| 4,605,233 | 8/1986 | Sato | 277/80 |
| 4,904,148 | 2/1990 | Larsson | 901/28 X |
| 4,953,992 | 9/1990 | Torii et al. | 384/488 X |

OTHER PUBLICATIONS

Ferrofluidics Corporation, "Ferrofluidic Metric Vacuum Rotary Feedthroughs", (Information Bulletin).

Rigaku Corporation, Rigaku/Magnetic Rotary Seal Unit—Rotary Feedthrough, RMS Series, pp. 1–10.

*Primary Examiner*—Allan D. Herrmann
*Attorney, Agent, or Firm*—Fish & Richardson, P.C.

[57] ABSTRACT

A robotic arm has a base with a top surface and an aperture therein. A shaft extends up through the aperture, and there is a gap between the shaft and an inner edge of the aperture. A splash guard may extend over said gap, and an indentation in said top surface may at least partially surround the gap. A seal, including a bearing and a barrier, is located in the gap. The bearing allows the inner and outer surfaces to rotate relative to each other. The barrier includes a plurality of annular outward-pointing flanges attached to an inner surface interleaved with a plurality of annular inward-pointing flanges attached to an outer surface. The flanges may be angled and have an upturned lip located at an inner edge of each flange. The seal may include a magnet attached to a flange.

3 Claims, 6 Drawing Sheets

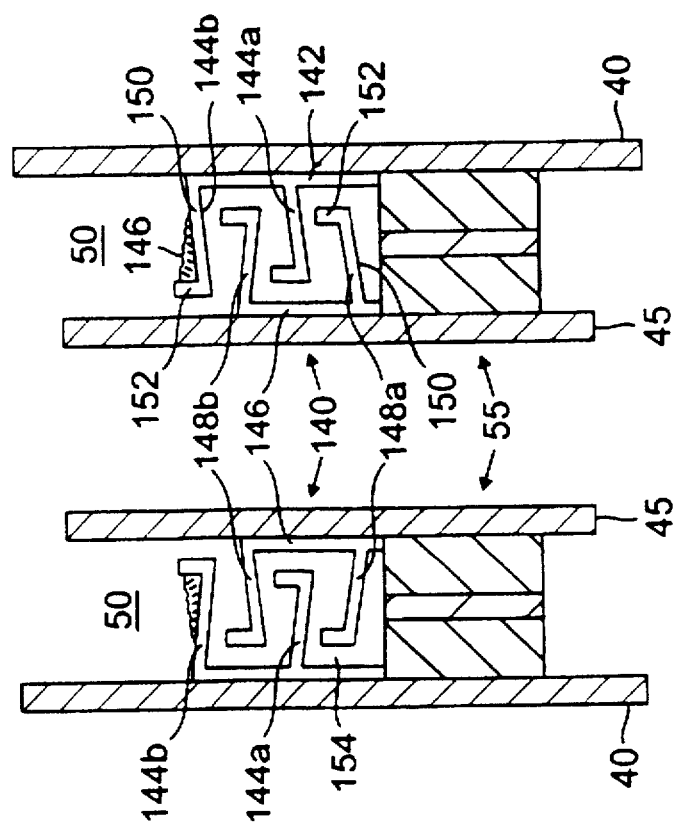
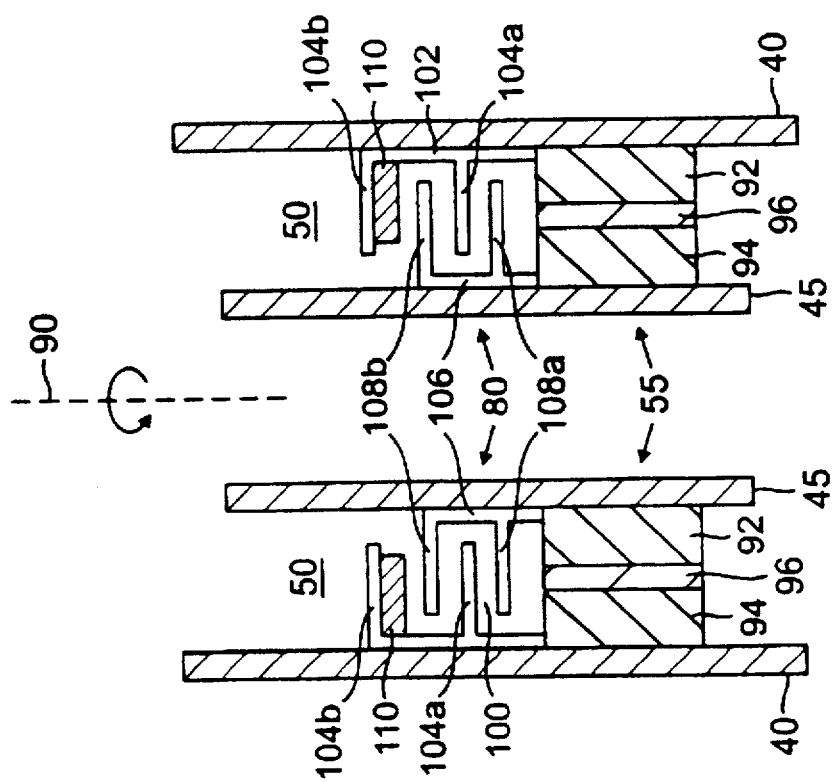

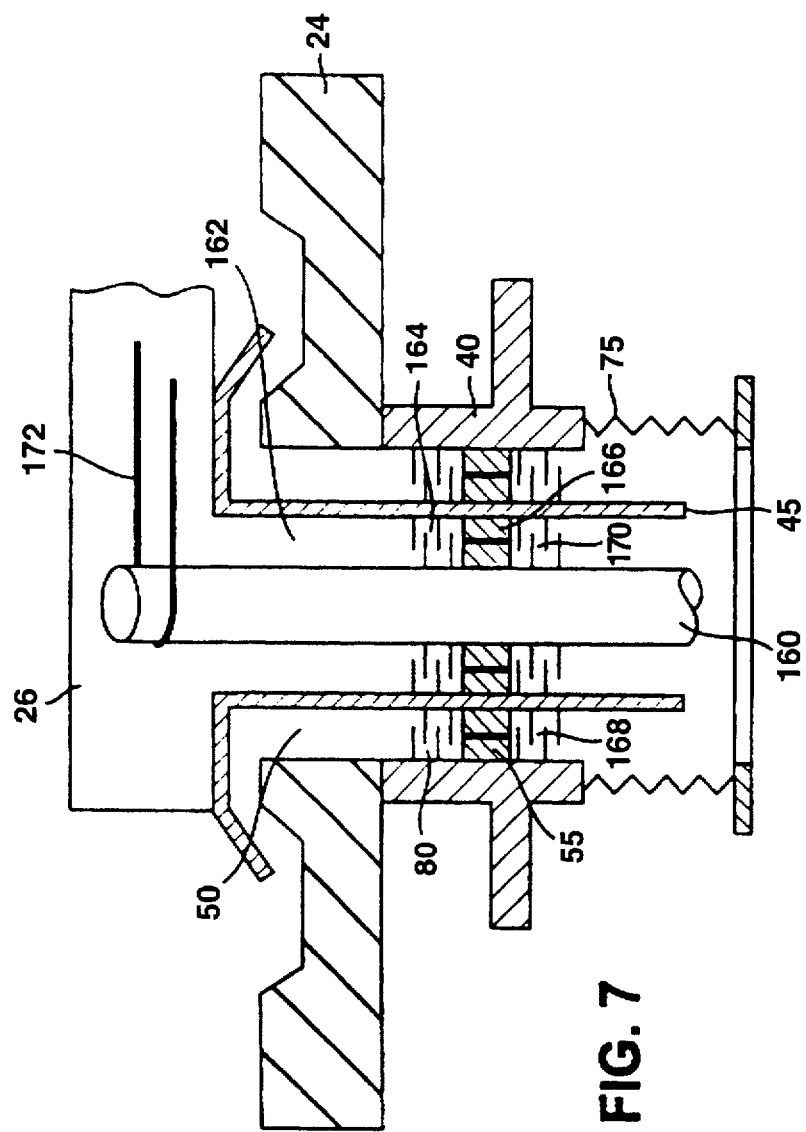

ROBOTIC ARM HAVING A SPLASH GUARD

CROSS-REFERENCE TO RELATED APPLICATIONS

This application is a continuation-in-part of U.S. application Ser. No. 08/500,124, filed Jul. 10, 1995, now U.S. Pat. No. 5,676,472 and assigned to the assignee of the present application.

Reference also is made to U.S. application Ser. No. 08/500,428, filed Jul. 10, 1995, U.S. application Ser. No. 08/500,429, filed Jul. 10, 1995, U.S. application Ser. No. 08/677,402, filed Jul. 9, 1996, and U.S. application Ser. No. 08/677,493, filed Jul. 9, 1996, and concurrently filed U.S. application Ser. No. 08/677,493 entitled ROBOTIC JOINT USING METALLIC BANDS, all of which are assigned to the assignee of the present application, and each of which are hereby incorporated by reference.

BACKGROUND OF THE INVENTION

The present invention relates generally to seals for rotating shafts, and more particularly to labyrinth seals and splash guards to protect a bearing and/or rotary seal between rotating shafts.

Material handling robots are used in automated manufacturing of integrated circuits, flat panel displays, and other precision-made products. Many of these products require near-sterile handling of extremely fragile and expensive materials, such as semiconductor wafers, during the manufacturing process. In semiconductor manufacturing, raw materials and in-process workpieces must be kept extremely clean; the circuit paths etched on the workpieces are so small (e.g., 0.18-10 microns) that minute particles can contaminate the paths and render the finished circuit inoperative. Therefore, sealed, ultra-clean robots are used to move the materials accurately, gently, and precisely, within a clean room, preventing contamination or damage to the materials which could occur through human contact or handling. However, such robots must not generate particles of metal, leak chemicals, or produce other materials which could contaminate a wafer or other workpiece.

Further, robots must move precisely to specific points in space to carry out various manufacturing steps. Because wafers, flat panels, and other workpieces are extremely fragile and expensive, all robot movements must be gentle and precise. "Backlash," or play in the mechanical components of the robot, must be minimized to ensure accurate movement and to prevent damage to an object on the robot.

In addition, some manufacturing processes are carried out in a vacuum or require hazardous chemicals. Robots must be vacuum-compatible, and able to handle materials in vacuum and corrosive environments which are hostile to humans.

In many manufacturing applications, as shown in FIG. 1, a rotating shaft 7 extends through a chamber wall 15 into a chamber 10, such as a vacuum chamber. Shaft 7 is connected to some instrument 8, such as a robotic arm, a stirrer, a substrate support or an electrode, in chamber 10. Because shaft 7 is driven by a motor at normal atmospheric pressure, the joint between shaft 7 and wall 15 must be sealed by a rotary seal 5 to prevent contamination from of chamber 10.

Seal unit 5 includes a housing 12 which surrounds shaft 7 and a rotatable joint 14. Joint 14 might be a bearing, such as a ball bearing, or it could be seal, such a a rubber O-ring. A conventional manner of sealing a gap between a rotatable shaft and chamber wall 15 is a rubber O-ring. A more recent type of seal that may be used is a magnetic fluid or "ferrofluid" rotary seal. As shown in FIG. 1, the magnetic fluid rotary seal may include a ring of magnetic liquid 18 in the gap between the moving shaft 7 and the stationary housing 12. Magnetic liquid 18 is held in place by magnets 16, thereby sealing the gap while allowing rotation of shaft 7, virtually without abrasive friction. There is, however, a substantial viscous drag torque due to the viscosity of magnetic liquid 18.

There are two problems associated with the use of rotary seal unit 5. First, particles might escape seal unit 5 and contaminate chamber 10. A total failure of the seal, under atmospheric pressure, can cause catastrophic blow-out of the fluid into chamber 10. This is disastrous in ultra-clean manufacturing processes such as semiconductor wafer fabrication. Second, particles from chamber 10 might enter and damage seal unit 5.

SUMMARY OF THE INVENTION

In general, in one aspect, the present invention is directed to a radial seal. There is a radial bearing located in a gap between an inner surface and an outer surface. The radial bearing allows the inner and outer surfaces to rotate relative to each other. A radial barrier is located in the gap. The radial barrier includes a plurality of annular outward-pointing flanges attached to the inner surface interleaved with a plurality of annular inward-pointing flanges attached to the outer surface.

Implementations include the following. The flanges in the radial seal may be angled and have an upturned lip located at an inner edge of each flange. The radial seal may include a magnet.

In general, in another aspect, the invention is directed to robotic arm. The robotic arm comprises a first housing having a top surface and an aperture therein. A shaft extends up through the aperture, and there is a gap between the shaft and an inner edge of the aperture. An indentation in the top surface at least partially surrounds the gap. A splash guard may extend over the gap.

The advantages of the present invention include the following. The invention provides a rotary seal unit to block the passage of contaminates. The rotary seal also protects the rotary bearing of a drive mechanism from contaminants in the chamber.

Additional objects and advantages of the invention will be set forth in the description which follows, and in part will be obvious from the description, or may be learned by practice of the invention. The objects and advantages of the invention may be realized by means of the instrumentalities and combinations particularly pointed out in the claims.

BRIEF DESCRIPTION OF THE DRAWING

The accompanying drawings, which are incorporated in and constitute a part of the specification, schematically illustrate the invention, and together with the general description given above and the detailed description given below, serve to explain the principles of the invention.

FIG. 4 is a schematic cross-section of a labyrinth seal including a magnet.

FIG. 6 is a schematic cross-section of an angled labyrinth seal.

FIG. 7 is a view of FIG. 3 in which the outer shaft has been removed for clarity.

DESCRIPTION OF THE PREFERRED EMBODIMENTS

Figure 1:
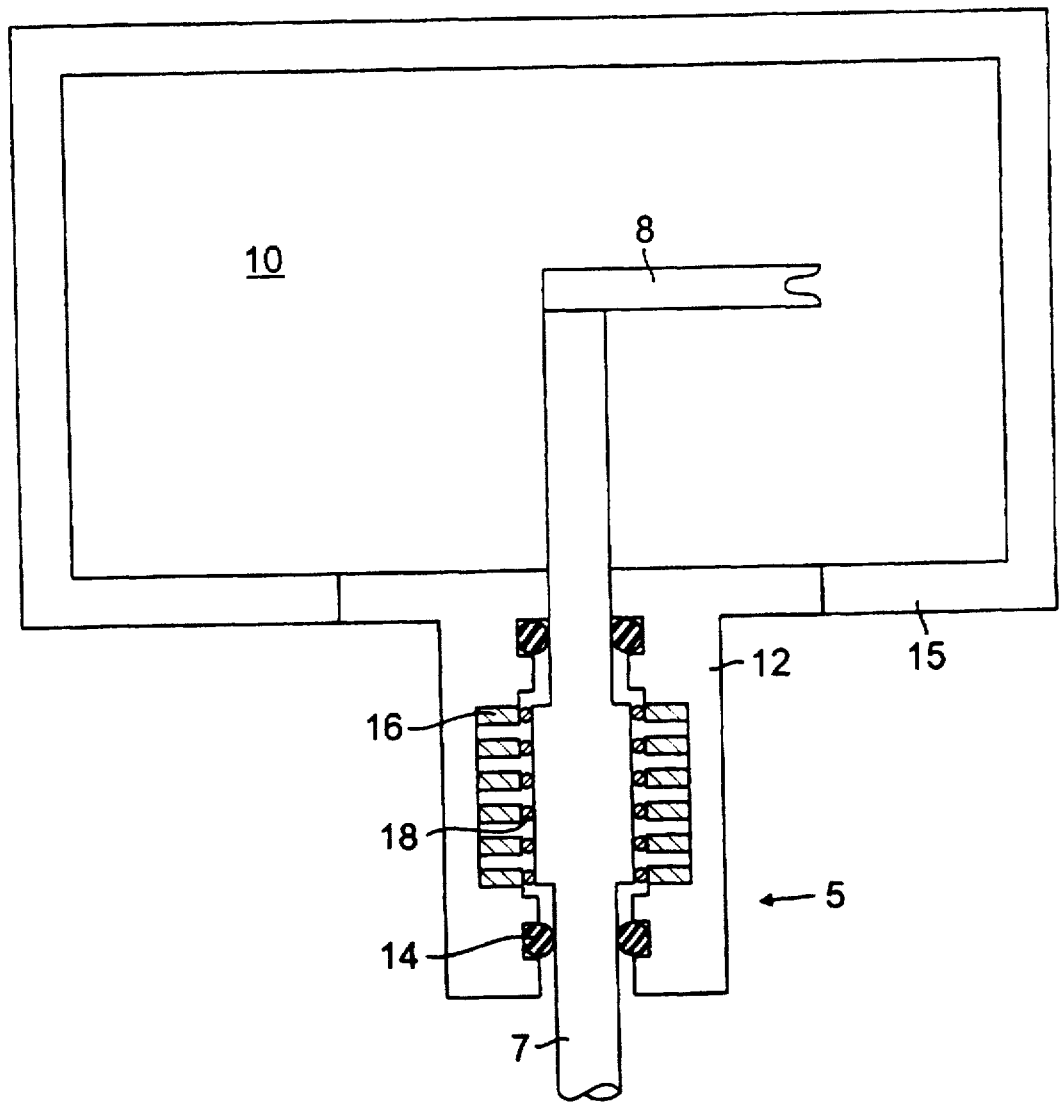
FIG. 1 is a schematic cross-sectional view of a prior art rotary seal.
Figure 2:
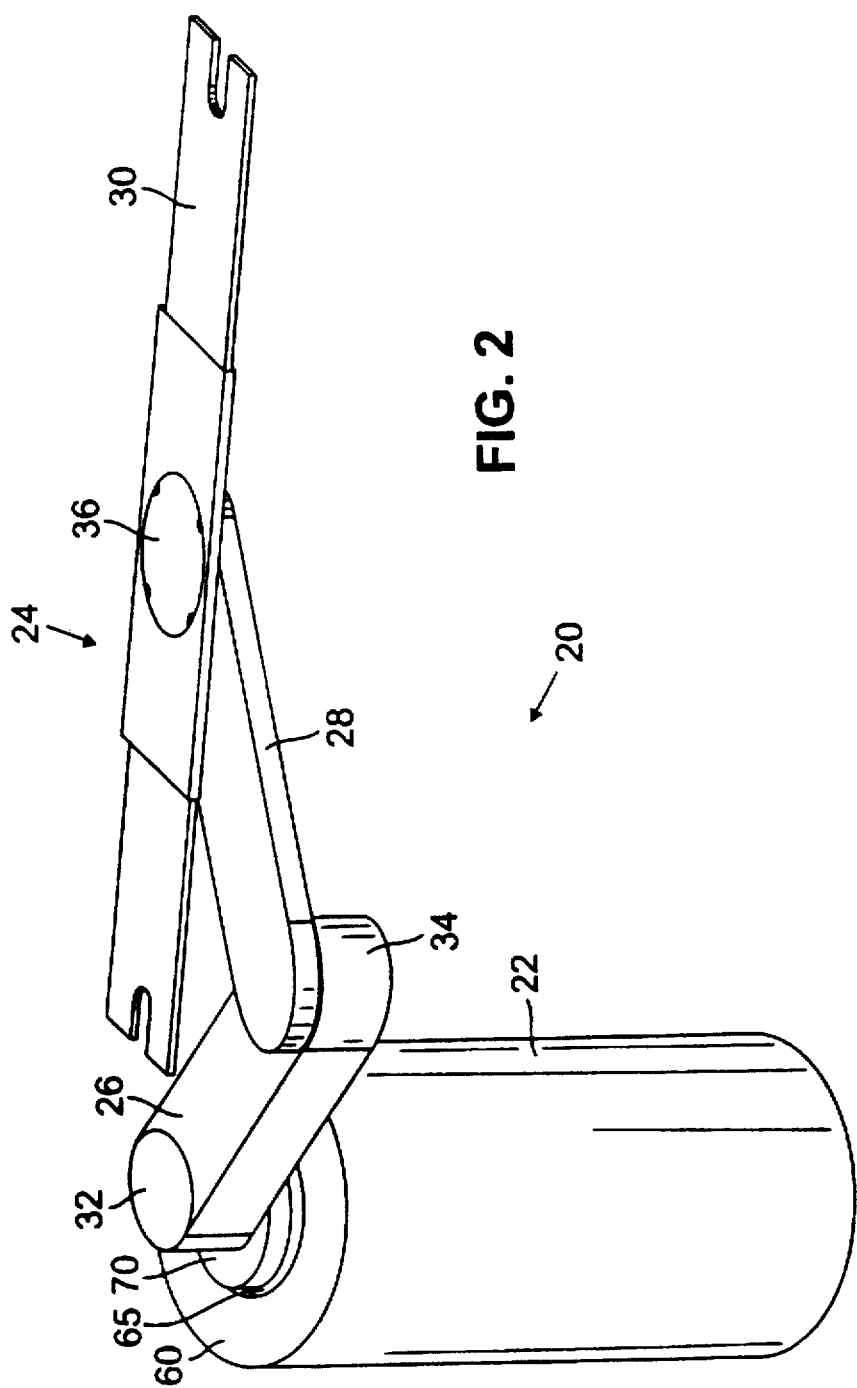
FIG. 2 is a schematic perspective view of a robot.

As shown in FIG. 2, a robot 20 is constructed to mimic the lateral freedom of motion of a human arm. Robot 20 has a base 22 with an attached movable arm 24. Arm 24 includes an upper arm 26, a forearm 28, and a hand or end effector 30. Upper arm 26 is connected to base 24 by a rotatable shoulder 32; forearm 28 is connected to upper arm 26 by a rotatable elbow 34; and hand 30 is connected to forearm 28 by a wrist 36.

Referring to FIG. 7, base 22 contains motors (not shown) to drive two concentric rotatable shafts. An outer rotatable shaft 45 controls the rotation of shoulder 32, whereas an inner shaft 160 controls the rotation of elbow 34. The outer shaft 45 that is connected directly to upper arm 26. The inner shaft 160 is connected to a pulley (not shown) in elbow 34 by a drive belt 172 which runs inside arm 26.

For many applications, such as semiconductor fabrication, movable arm 24 of robot 20 must manipulate objects in a vacuum chamber. However, base 22 is usually operated at normal atmospheric pressure. Therefore, a vacuum seal needs to be formed at the joint between arm 24 and base 22. For other applications, robot 20 manipulates objects in an ultraclean environment. Therefore, the joint between arm 24 and base 22 is sealed to prevent contaminants from entering the ultraclean environment.

Figure 3:
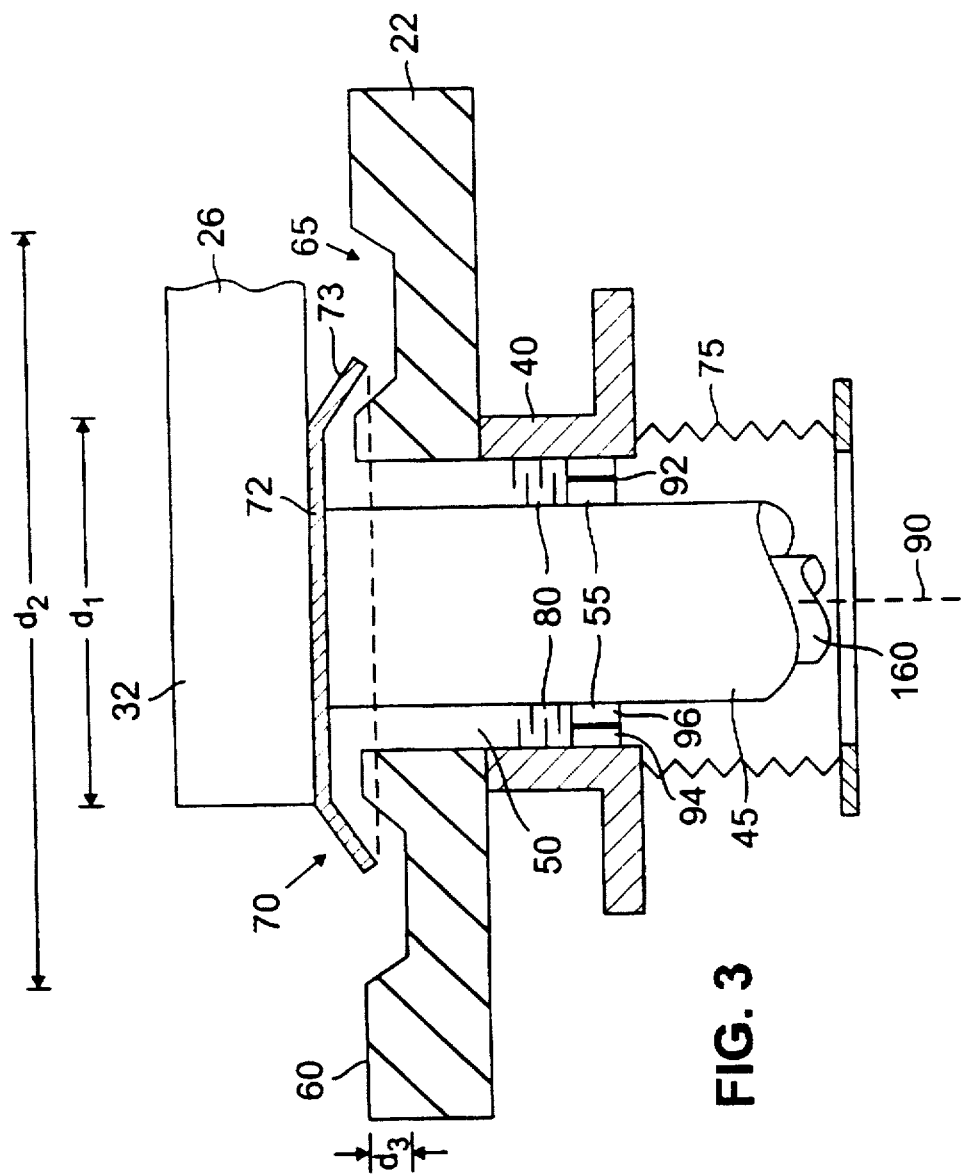
FIG. 3 is a schematic partial cross-section of the shoulder joint in a robotic arm.

As shown in FIG. 3, according to the present invention, base 22 includes a circular housing 40 surrounding outer shaft 45. The outer shaft projects through an aperture at the top of the housing. A gap 50 separates the inner wall of housing 40 from the outer surface of shaft 45. A bearing 55 is positioned in gap 50. Bearing 55 may be a pair of ball bearings. Bearing 55 may also include a seal, such as a rubber O-ring or a magnetic fluid seal, or a combination of bearings and seals. The bearing allows shaft 45 to rotate along its primary or central axis 90 relative to the housing 40. Preferably, bearing 55 is a magnetic fluid rotary seal which includes multiple magnetic liquid rings. Such a ferrofluidic seal may be constructed as described in U.S. Pat. No. 4,605,233, which is hereby incorporated by reference. Since each additional ring increases the pressure differential the seal can sustain without rupturing, a sufficient number of rings will allow base 22 to be maintained at atmospheric pressure while arm 24 operates in a vacuum. Bearing 55 includes an inner support structure 92 attached to shaft 45 and an outer support structure 94 attached to housing 40. A sealant or bearing material 96 is disposed between the support structures.

Above bearing 55, in gap 50 between housing 40 and shaft 45, there is a labyrinth seal 80. Labyrinth seal 80 will be explained in detail with reference to FIG. 4. Continuing with FIG. 3, beneath housing 40 is a bellows 75, which is formed like a cylindrical metal accordion. Bellows 75 permits the entire arm to be vertically actuated by a lifting mechanism (not shown).

Since movable arm 24 operates in an ultraclean environment or vacuum chamber, any leakage of sealing material or bearing material from bearing 55 into the chamber must be prevented. For example, droplets of magnetic liquid might escape from the magnetic fluid seal and contaminate the vacuum chamber. As another example, the metal surface of the inner wall of housing 40 might grind particles off an elastomeric bearing and contaminate the ultraclean environment.

It is also possible for bearing 55 to be contaminated by material from the chamber side. For example, sputtered materials may lodge in the bearing, or cleaning solution may be spilled into gap 50. When such a contaminant enters bearing 55, it may dilute the magnetic fluid and destroy the bearing. Also, if bearing 55 is damaged, then the cleaning solution may pass through bearing 55. The cleaning solution may carry metal particles from the surface of arm 24, and these metal particles may lodge on the pleats of bellows 75. When bellows 75 compresses and the pleats fold together, the lodged particles will damage the bellows.

The top surface 60 of base 22 has an indentation or depression to catch a liquid, such as cleaning solvent, and prevent it from entering gap 50. Preferably, the indentation is a circular moat 65 located around shoulder 32. A splash guard 70 is mounted at the bottom of shoulder 32, surrounding shaft 45. Splash guard 70 may be firmly attached to either the bottom of arm 26, or to shaft 45, but in either case it will rotate with shaft 45. Splash guard 70 may be attached by bolts, by a key-in-slot lock or by welding. Splash guard 70 is formed as a circular disk 72 with a downwardly angled edge 73. Circular disk 72 projects beyond shoulder 32 and downturned edge 73 drops slightly below top surface 60 of base 22 into moat 65. Moat 65 is deep and wide enough to hold about four cubic inches of liquid. Assuming that top surface 60 of base 22 has a diameter of sixteen inches, then, by way of example, the moat may have an inner diameter $d_1$ of about 6.5 inches, an outer diameter $d_2$ of about 8.0 inches, and a depth $d_3$ of about 0.35 inches. The dimensions of moat 65 are selected so that splash guard 70 does not contact top surface 60 of base 22 as shaft 45 rotates.

If a liquid is splashed directly on arm 26 in the area of shoulder 32, then the liquid will run down the sides of shoulder 32, onto splash guard 70, and into moat 65. The liquid will collect in moat 65 rather than enter gap 50. For example, if someone cleaning robot 20 pours alcohol directly on shoulder 32, the alcohol will pool in moat 65 and not reach bearing 55. Pooled liquid in moat 65 may later be removed by an eyedropper or by soaking it into an absorbent material. Alternately, the liquid may be left to evaporate.

As shown in FIG. 4, labyrinth seal 80 is located adjacent bearing 55 in the gap between shaft 45 and housing 40. Labyrinth seal 80 generally takes the form of an annular ring with an annular passageway 100 having a tortuous intrawound path from gap 50 at the top of the ring to bearing 55 at the bottom of the ring. Labyrinth seal 80 includes an outer (relative to the drive shaft) cylindrical wall or surface 102 having inwardly-extending radial flanges 104a, 104b, and an inner cylindrical wall or surface 106 having outwardly extending radial flanges 108a, 108b. Flanges 104a, 104b are interleaved with flanges 108a, 108b to form passageway 100. Although FIG. 4 shows exactly four flanges, the invention can apply to two or more flanges.

The flanges of labyrinth seal 80 act as a barrier to particles that escape bearing 55. For example, if bearing 55 is a magnetic fluid seal, then magnetic fluid that leaks from bearing 55 may be captured in passageway 100. The greater the number of flanges, the more tortuous the passageway 100, and the more likely that particles will be trapped. In addition, in the event of a catastrophic failure of bearing 55, labyrinth seal 80 can prevent contaminants from entering chamber 10. This is because the intrawound path 100 provides a large volume in which contaminants can accumulate.

In addition, the flanges of labyrinth seal 80 act as a barrier to contaminants from chamber 10. For example, sputtered materials or cleaning fluid from chamber 10 may be captured in passageway 100.

In general, the ratio between the width of gap 50 and the distance between adjacent flanges should be about 3:1. The flanges should project into gap 50 sufficiently to overlap, and there should not be a straight path from bearing 55 to the open area of gap 50. Preferably, the flanges project about ¾ of the distance to the opposite wall.

Figure 5:
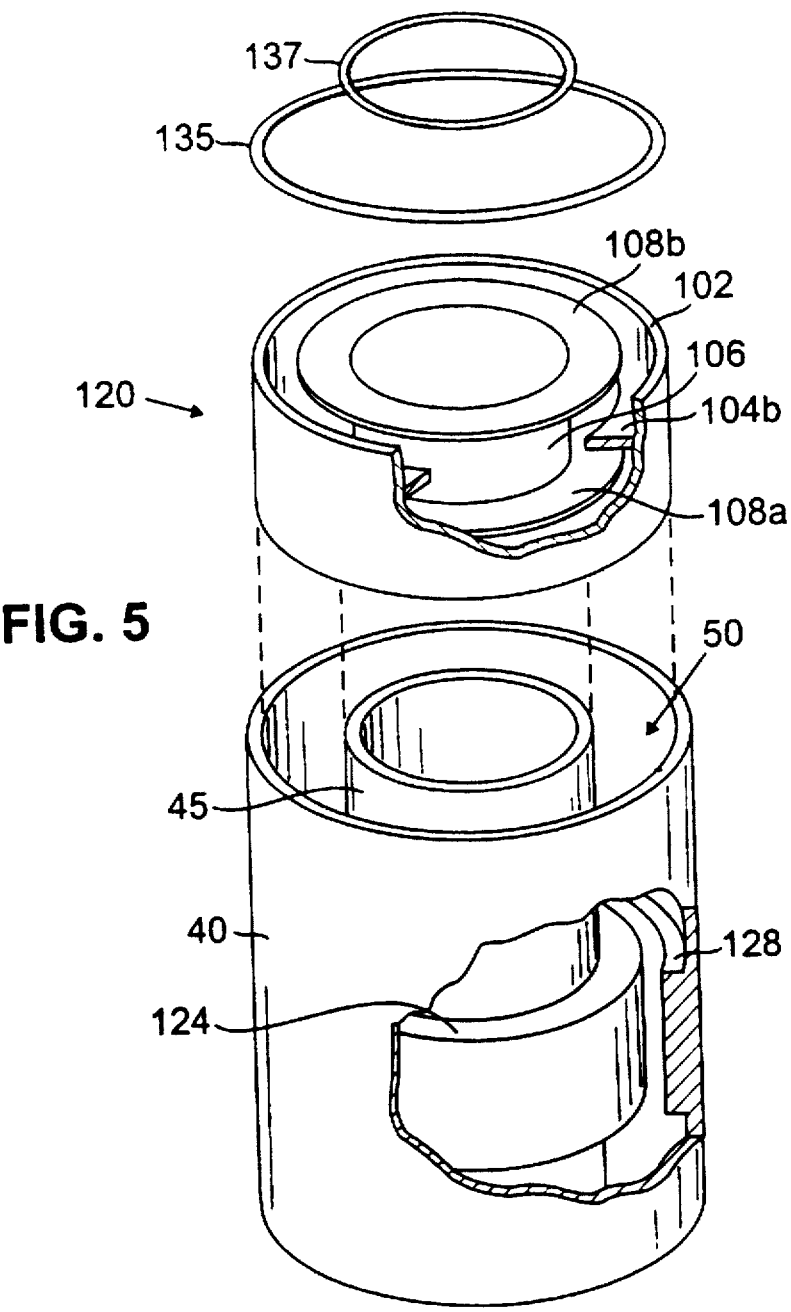
FIG. 5 is a schematic perspective view of a labyrinth seal module with a portion cut away.

As shown in FIG. 4, labyrinth seal 80 may be formed as an integral part of shaft 45 and housing 40, or, as shown in FIG. 5, labyrinth seal 80 may be manufactured as a separate module 120 which is inserted into gap 50.

Labyrinth seal 80 may also be integrated with bearing 55 as a single module. In such an embodiment, the inner and outer walls 106 and 102 would be attached to the inner and outer support structures 92 and 94, respectively. Referring to FIG. 4, if labyrinth seal 80 is an integral part of shaft 45 and housing 40, then outward-pointing flanges 108a, 108b could be attached directly to shaft 45, which would serve as inner surface 106. Similarly, inward-pointing flanges 104a, 104b could be attached directly to housing 40, which would serve as outer surface 102.

Alternately, as shown in FIG. 5, labyrinth seal 80 may be formed a separate module 120 which is inserted into gap 50. The inner wall 106 of the module rests on a step 124 on shaft 45 and outer wall 102 rests on a step 128 on housing 40. Outwardly-directed flanges 108a and 108b are attached to inner wall 106, and inwardly directed flanges 104a and 104b are attached to outer wall 102. After module 120 is inserted into gap 50, circular clips 135 and 137 are used to clip inner wall 106 to shaft 45 and outer wall 102 to housing 40.

As shown in FIG. 4, labyrinth seal 80 may include one or more magnets 110. The magnet 110 may be a radial washer attached to the uppermost flange (e.g. flange 104b). If bearing 55 produces magnetic particles, then magnet 110 will help to prevent those particles from contaminating the ultraclean environment. For example, if bearing 55 is a magnetic fluid seal, then magnetic liquid which escapes from bearing 55 will be attracted and held by magnet 110, and will be less likely to escape seal 80.

As shown in FIG. 6, the flanges of a labyrinth seal 140 may be angled away from the horizontal. Labyrinth seal 140 includes an outer cylindrical wall or surface 142 having inwardly extending radial flanges 144a and 144b, and an inner cylindrical wall or surface 146 having outwardly-extending radial flanges 148a and 148b. Flanges 144a, 144b are interleaved with flanges 148a, 148b to form a tortuous passageway 154. Each flange includes an angled body portion 150 terminating in an upturned lip 152. The body portion of upper flanges 144a, 144b and 148b may be angled downwardly, whereas the body of lowest flange 148a may be angled upwardly. The angled body and upturned lip structure of the flanges help prevent bearing 55 from being contaminated by materials from chamber 10. For example, liquid may be spilled or poured into gap 50 when equipment is washed down with cleaning solvents. The liquid which enters gap 50 will be trapped on body portion 150 by lip 152 to form a pool 146. In case of an overflow from the upper flanges, the upward angle of the base of lowest flange 148a provides additional storage capacity for the liquid. Eventually, pool 146 will evaporate. The angled flanges also provide the tortuous passageway which can prevent contaminants, such as droplets of magnetic liquid from bearing 55, from entering chamber 10.

Referring to FIG. 7, there is a gap 162 between outer shaft 45 and inner shaft 160. Two labyrinth seals 80 and 164 are positioned concentrically in gaps 50 and 162, respectively, above bearings 55 and 166. Two additional concentric labyrinth seals 168 and 170 may be placed below bearings 55 and 166, respectively, to provide additional protection for bellows 75.

The present invention has been described in terms of a preferred embodiment. The invention, however, is not limited to the embodiment depicted as described. Rather, the scope of the invention is defined by the appended claims.

What is claimed is:

1. A robotic arm, comprising:

a first housing which provides a base of the robotic arm, the housing having a generally horizontal and integral top surface with an aperture therein;

a drive shaft extending up through said aperture and connected to a second housing which provides a generally horizontal link of the robotic arm, there being a gap between said shaft and an inner edge of said aperture;

an indentation in said top surface spaced apart from and at least partially surrounding said gap; and a splash guard connected to said shaft, said splash guard extending over said gap.

2. The robotic arm of claim 1 wherein said splash guard extends at least partially over said indentation in said top surface.

3. The robotic arm of claim 2 wherein said splash guard has a downturned edge positioned to direct liquid into said indentation.

* * * * *